United States Patent [19]

Doi et al.

[11] Patent Number: 4,903,187

[45] Date of Patent: Feb. 20, 1990

[54] CONTROL FOR VARIABLE FREQUENCY DRIVE

[75] Inventors: Kazuhiko Doi, Narita; Yasutami Kito, Tokyo, both of Japan

[73] Assignee: Otis Elevator Company, Conn.

[21] Appl. No.: 339,736

[22] Filed: Apr. 18, 1989

[30] Foreign Application Priority Data

Apr. 18, 1988 [JP]  Japan .................................. 63-94899

[51] Int. Cl.$^4$ ............................................ H02M 5/44
[52] U.S. Cl. ........................................ 363/95; 363/37; 363/98
[58] Field of Search ..................... 363/37, 41, 95, 98, 363/132

[56] References Cited

U.S. PATENT DOCUMENTS

| | | | |
|---|---|---|---|
| 4,546,422 | 10/1985 | Okado | 363/132 |
| 4,597,037 | 6/1986 | Okado | 363/98 |
| 4,675,802 | 6/1987 | Sugimoto | 363/41 |
| 4,772,996 | 9/1988 | Hanei et al. | 363/98 |

*Primary Examiner*—Patrick R. Salce
*Assistant Examiner*—Jeffrey Sterrett
*Attorney, Agent, or Firm*—Francis J. Maguire, Jr.

[57] ABSTRACT

A star-connected sensing resistor at the A.C. output side of a PWM inverter detects an output voltage across the resistor, a PWM control according to the invention then amplifies the detected voltage, compares the amplified voltage with a sine wave voltage command signal, amplifies the compared output in a P-I amplifier having a definite gain for a D.C. current, compares the P-I amplified output to a carrier and thus provides a PWM output for controlling the inverter.

1 Claim, 2 Drawing Sheets

CONTROL FOR VARIABLE FREQUENCY DRIVE

DESCRIPTION

1. Technical Field

The present invention relates to a PWM inverter.

2. Background Art

In a PWM system voltage-type inverter, heretofore, it has been very difficult to modulate a lower frequency bandwidth or a lower voltage of a signal to a sine waveform Since the inverter typically provides a PWM control circuit having a comparator for comparing a triangular carrier waveform with a sine signal waveform, the output voltage is distorted considerably because of the lag caused from securing a dead time of a main circuit transistor and the lag of the transistor itself however proper a command sine waveform may be.

The motor using the foregoing inverter cannot be driven smoothly. High frequency switching transistors have become especially widely used in recent years. That is, as the chopping frequency used for pulse-width modulation is made higher, the lag of a transistor circuit output and the distortion of an output waveform are increased. If the motor is driven by a circuit output having a distorted output waveform, some disadvantages such as hunting of the motor current and a large rotation ripple may be caused. As a result the motor cannot be driven Furthermore, in case of using a PWM inverter in which closed-loop speed control or ASR (automatic speed variation) control is not performed, it is very difficult to constantly obtain a precisely controlled or constant speed.

DISCLOSURE OF INVENTION

Therefore, it is an object of the present invention to provide a PWM inverter that can stably control a motor, even at a quite low speed, by detecting the A.C. output voltage of an inverter main body at both ends of a resistor that is star-connected to the inverter, matching the amplified and detected voltage to a sine waveform voltage command signal, amplifying and controlling the matched result by a P-I amplifier (proportional integral amplifier) for obtaining a definite gain of low frequency components.

According to the present invention, a PWM inverter control is responsive to an output voltage detection section for detecting a voltage on the A.C. output line of the inverter comprises a P-I amplification section for amplifying a signal indicative of a comparison of the output voltage detection section with a sine wave voltage command signal and obtaining a definite gain of direct current components from the compared output, and a comparator section for comparing the amplified output of the P-I amplification section with the output of a carrier voltage command section for obtaining a PWM control signal, thereby providing control for causing motor rotation with little torque ripple at quite a low speed, even in an open loop speed control.

In further accord with the present invention, a PWM inverter control is responsive to a detected voltage across a resistor that is star-connected to the A.C. output line of the inverter, provides the detected voltage to a differential amplification section, matches the output of the differential amplification section with a sine wave voltage command signal, amplifies (proportional integral) the matched signal for obtaining a definite gain for the low frequency component from the matched signals, and matches the P-I amplified signal to the carrier waveform for obtaining PWM control signals.

The PWM inverter may thus have a resistor that is star-connected at the A.C. output side of the inverter main body which detects an output voltage across the resistor, and the PWM control then amplifies the voltage detected and compares the amplified voltage with a sine wave voltage command signal, amplifies the compared output in a P-I amplifier having a definite gain for a D.C. current, matches the amplified output to a carrier voltage command signal and compares these matched outputs in a comparator, and thus provides a PWM output for controlling the inverter main body.

Thus, according to the present invention, it is possible to control a motor to provide rotation with little torque ripple at high to quite a low speed, even in an open speed control loop since a precise voltage waveform and output voltage value are obtained even at quite a low frequency. Moreover, since a definite gain of D.C. components is assumed to be obtained, it is possible to provide a constantly stable and rapidly responsive inverter without any slippage of the center in each phase.

These and other objects, features and advantages of the present invention will become more apparent in light of the following detailed description of an exemplary embodiment thereof.

BEST MODE FOR CARRYING OUT THE INVENTION

The present invention is described with reference to FIG. 1, which is a circuit diagram showing one embodiment thereof.

Figure 1:
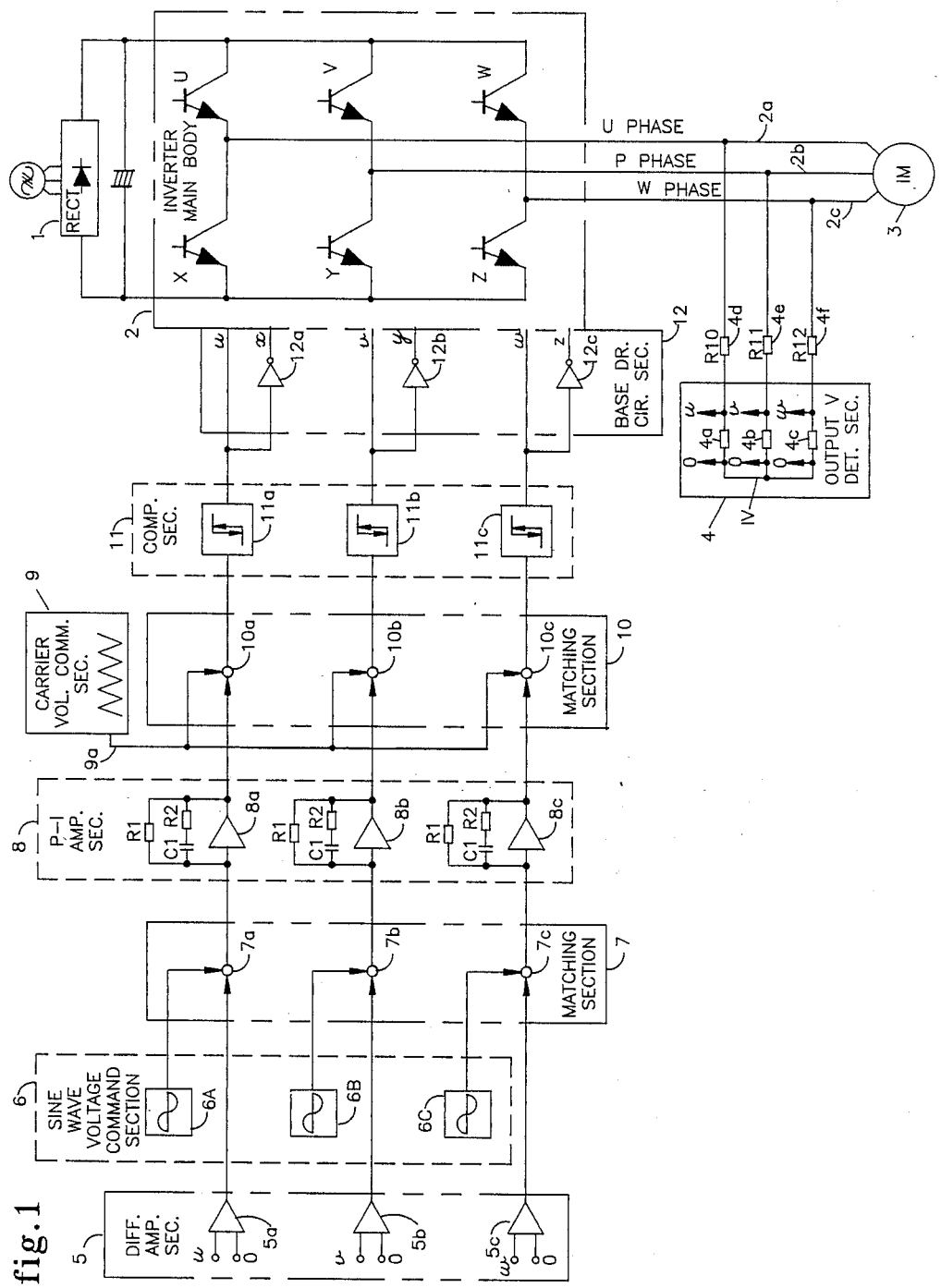
FIG. 1 is a circuit diagram showing one embodiment of the present invention.

In FIG. 1, a rectifier 1 converts alternating current into direct current provided to an inverter main body 2 for converting a D.C. power into a A.C. power. This inverter main body 2 consists of transistors u, v, w, x, y and z which are three-phase, bridge-connected with one another. The output voltage and the output frequency of the inverter are controlled by pulse width modulation (PWM) and provide a three-phase output on lines 2a, 2b, 2c. A motor 3 is connected to the inverter main body lines 2a, 2b, 2c, which is assumed to be a load.

A PWM control unit comprises elements 4 to 12 described below.

An output voltage detection section 4 comprises resistors 4a, 4b, 4c each star-connected through resistors 4d, 4e, 4f (R10, R11, R12) to output lines 2a, 2b, 2c, corresponding respectively to u phase, v phase and w phase on the inverter main body 2. It obtains voltage signals in proportion to output voltages from output terminals O-u, O-v and O-w of the resistors 4a to 4c.

A differential amplifier section 5 comprises differential amplifiers 5a, 5b, 5c, which respectively receive A.C. voltage signals from the output terminals O-u, O-v and O-w of the output voltage detector section 4 at the input terminals of these differential amplifiers 5a, 5b, 5c. Hence, the outputs of these differential amplifiers 5a, 5b, 5c have the waveform of the reverse phase to those of a sine wave voltage command section 6 and including direct current components.

A matching section 7 comprises comparators 7a, 7b, 7c, which may be summers, each for comparing or adding the sine wave voltages supplied from sine wave voltage generators 6a, 6b, 6c with the sine wave voltage output from the differential amplifiers 5a, 5b, 5c.

A Proportional-Integral (P-I) amplifier section 8 includes integral amplification circuits and gain circuits comprising amplifiers 8a, 8b, 8c, each having an associated resistor R2 and a capacitor $C_1$, as well as a resistor R1 connected for the gain circuits. The P-I amplification section 8 provides an output having a definite characteristic directed to a low frequency. The P-I amplifier section 8 constantly obtains a stable control characteristic by utilizing the error signals between the outputs from the differential amplifier section 5 and the sine wave voltage command section 6, then amplifying and controlling the result.

A carrier wave voltage command section 9 is connected through a common line 9a to comparators 10a, 10b, 10c included in a matching section 10 which compares the carrier wave voltage command signal on line 9a with the output signals from the P-I amplification section 8.

A comparator damping section 11 comprises circuits 11a, 11b, 11c, each for providing a hysteresis or damping function on the outputs of comparators 10a, 10b, 10c for a PWM base drive section 12.

The base drive section 12 includes terminals u, v and w for outputting the exact output signals from comparator damping circuits 11a, 11b, 11c and signal terminals x, y, and z for outputting the signals that are reversed from the outputs of comparator circuits 11a, 11b, 11c. These terminals u, v and w and terminals x, y and z are respectively connected (not shown to avoid congestion of lines) to the bases of he transistors U, V and W and transistors X, Y and Z so as to drive these transistors.

Next, the operation of the disclosed embodiment of this invention is described.

The output voltage of the inverter is sensed in the output voltage detector section 4 and differentially amplified in differential amplifier section 5. Hence, the output signal has a phase that is the reverse of the voltage waveform command signal sent from the sine wave voltage command section 6 and includes a direct output waveform containing D.C. components. This because the output of the inverter is detected directly in the state of a voltage waveform containing D.C. components at both ends of each of the resistors 4a, 4b, 4c, since a transformer is not used. The output of the differential amplification section 5 is matched to the sine wave voltage command signal in the matching section 7 and is then input to the P-I amplification section 8. The output of the P-I amplification section is matched to the signal sent from the carrier voltage command section 9 in the matching section 10, and through the comparator section 11 and base drive section 12, controls the inverter main body 2.

Figure 2:
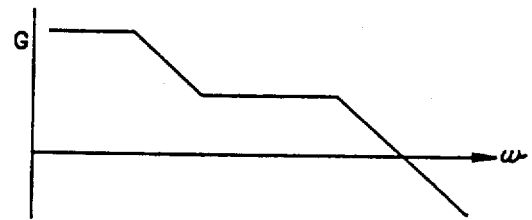
FIG. 2 is a view showing a characteristic of a control amplifier frequency according to one embodiment of the present invention.

The P-I amplification section 8 compares and amplifies the signals from the matching section 7 to provide a definite gain of low frequency components for constantly obtaining a stable control characteristic as shown in the control amplifier frequency characteristic in FIG. 2. That is, the three-phase output voltage of the inverter main body 2 is defined by the correlative combination of on and off of the three-phase transistors, but the constant relation of output values of the amplification circuits 8a, 8b, 8c allows the output voltages of the circuits 8a, 8b, 8c to be substantially the desired values even if the output values of the amplification circuits 8a to 8c are not symmetrical about the center of a carrier. If one phase of the P-I amplification section 8 (for example, amplification circuit 8a) includes D.C. components applied thereto and the center of the sine wave voltage waveform has slipped a little from OV as shown by the dashed line 20 in FIG. 3, the other two phases (amplification circuits 8b and 8c) begin to change The output voltage is generally assumed to be the desired value, but the center is not stable and is always changing. Hence, a phase in which is hard to control the waveform may be transiently generated and it is also difficult to provide a stable high-speed response to a rapid change in the voltage waveform command signal. The inclusion of the D.C. components inevitably results in providing and unstable response.

Figure 4:
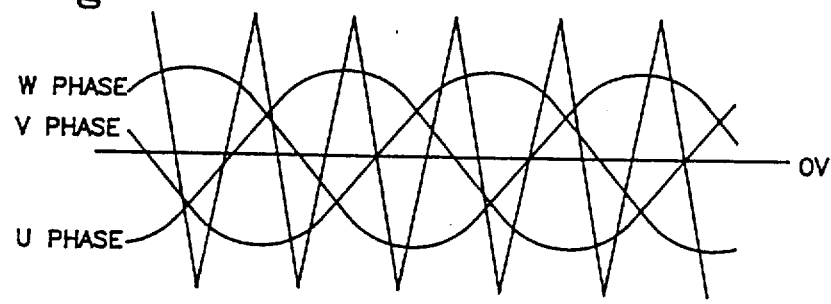
FIG. 4 is a view showing the relation between a carrier waveform and a sine waveform in the normal control time.

The disclosed inverter provides a resistor R1 for the gain circuit (comprising amplification circuits 8a, 8b, 8c included in the P-I amplification section 8) and thus obtains a definite gain of D.C. components from the gain circuit Hence, without any slippage of the center in each phase as shown in FIG. 4, it is possible to obtain a symmetrical amplification output with respect to OV and thus rapidly output a stable response.

For the closed loop control which has been disclosed, the D.C. output waveform is defined by a loop gain mainly consisting of the sine wave voltage command signal and the amplification gain of the amplification circuits 8a, 8b, 8c. As a result, a precise voltage waveform and output voltage value for even quite a low frequency are obtained, and therefore, it is possible to drive a motor with little torque ripple even at quite low speed.

Although the invention has been shown and described with respect to an exemplary embodiment thereof, it should be understood that the foregoing and other changes, omissions and additions may be made therein and thereto, without departing from the spirit and scope of the invention.

We claim:

1. A control for an inverter, comprising:
   an output voltage detection means having a star connected resistor for detecting a voltage of an A.C output line of the inverter and providing a sensed signal indicative thereof;
   a differential amplification section, responsive to the sensed inverter output voltage signal, for providing an amplified signal;
   a sine wave voltage command section for providing a voltage command signal in the form of a sine wave;
   summing means, responsive to said differentially amplified signal and to said sine wave voltage command signal for summing the output of the said differential amplification section with said sine wave voltage command signal and providing an error signal;
   a proportional-integral (P-I) amplification section, responsive to said error signal for amplifying said error signal with a selected gain of a low frequency component of said error signal and providing a P-I amplified output signal; and
   a carrier voltage command section for providing a carrier signal; and
   a comparator section for comparing said P-I amplified output signal to said carrier signal for providing a pulse width modulated (PWM) output signal.

* * * * *

UNITED STATES PATENT AND TRADEMARK OFFICE
CERTIFICATE OF CORRECTION

PATENT NO. : 4,903,187

DATED : February 20, 1990

INVENTOR(S) : Kazuhiko Doi and Yasutami Kito

Figure 3:
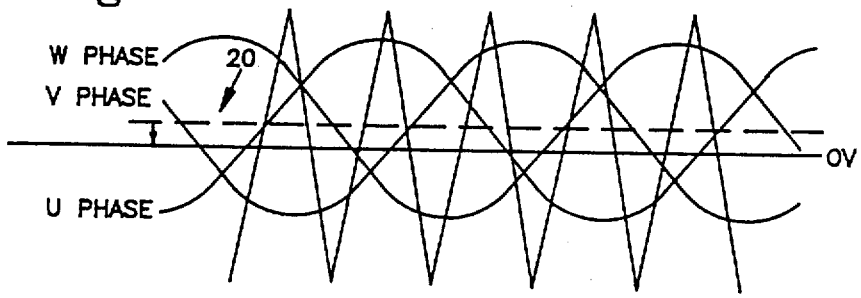
FIG. 3 is a waveform view showing the case in which a sine wave control amplification output is offset.

It is certified that error appears in the above-identified patent and that said Letters Patent is hereby corrected as shown below:

In the Drawings, add Sheet 2 with Figs. 2, 3 and 4 as shown on the attached sheet.

Col. 1, line 12, after "form" insert -- . --

Col. 1, line 28, after "result" insert -- , --

Col. 1, line 29, after "driven" insert -- . --

Col. 4, line 11, after "change" insert -- . --

Col. 4, line 14, after "which" insert -- it --

Col. 4, line 17, cancel "and" insert -- an --

Col. 4, line 23, after "circuit" insert -- . --

Signed and Sealed this

Fifth Day of February, 1991

Attest:

HARRY F. MANBECK, JR.

*Attesting Officer*  Commissioner of Patents and Trademarks